(12) United States Patent
Grasshoff

(10) Patent No.: US 7,352,080 B2
(45) Date of Patent: Apr. 1, 2008

(54) DEVICE AND METHOD FOR SUPPLYING THE TRIGGERING DEVICE OF AN OCCUPANT RESTRAINT SYSTEM WITH POWER

(75) Inventor: Helge Grasshoff, Tokyo (JP)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/296,685

(22) PCT Filed: Apr. 26, 2001

(86) PCT No.: PCT/DE01/01619

§ 371 (c)(1),
(2), (4) Date: Aug. 4, 2003

(87) PCT Pub. No.: WO01/92065

PCT Pub. Date: Dec. 6, 2001

(65) Prior Publication Data

US 2004/0099460 A1 May 27, 2004

(30) Foreign Application Priority Data

May 31, 2000 (DE) .................... 100 27 182

(51) Int. Cl.
*B60L 1/00* (2006.01)
*B60R 21/16* (2006.01)
*B60R 21/00* (2006.01)
*B60K 28/12* (2006.01)

(52) U.S. Cl. .................... 307/10.1; 280/735; 180/282; 180/268

(58) Field of Classification Search .................. 307/9.1, 307/10.1; 361/91.1, 247, 93.1; 180/282, 180/274; 280/735
See application file for complete search history.

(56) References Cited

U.S. PATENT DOCUMENTS

| | | | | |
|---|---|---|---|---|
| 4,358,755 A * | 11/1982 | Franklin | ...................... | 340/518 |
| 4,651,646 A * | 3/1987 | Foresman et al. | .......... | 102/208 |
| 5,327,014 A * | 7/1994 | Huber et al. | ................ | 307/10.1 |
| 5,564,736 A * | 10/1996 | Kim | ......................... | 280/730.2 |
| 5,564,737 A * | 10/1996 | Ito et al. | ....................... | 280/735 |
| 5,725,242 A * | 3/1998 | Belau et al. | ................. | 280/735 |
| 5,805,058 A * | 9/1998 | Saito et al. | .................. | 340/436 |
| 5,845,729 A * | 12/1998 | Smith et al. | ................. | 180/282 |
| 5,861,681 A | 1/1999 | Nakano et al. | | |
| 6,189,923 B1 * | 2/2001 | Tsubone | ...................... | 280/735 |
| 6,308,554 B1 * | 10/2001 | Mattes et al. | ................. | 73/1.37 |
| 6,534,882 B2 * | 3/2003 | Belau | ......................... | 307/10.1 |
| 6,566,765 B1 * | 5/2003 | Nitschke et al. | ............ | 307/10.1 |
| 6,580,279 B1 * | 6/2003 | Baumgartner et al. | ....... | 324/678 |
| 6,731,023 B2 * | 5/2004 | Rothleitner et al. | ........... | 307/64 |

FOREIGN PATENT DOCUMENTS

DE 44 09 019 A1 9/1994

(Continued)

*Primary Examiner*—Michael Sherry
*Assistant Examiner*—Michael Rutland-Wallis
(74) *Attorney, Agent, or Firm*—Laurence A. Greenberg; Werner H. Stemer; Ralph E. Locher

(57) ABSTRACT

The invention relates to a device that comprises a plurality of energy stores and a driver circuit. Said driver circuit is supplied by at least two of the energy stores via a selecting circuit in such a manner that the driver circuit is always supplied by the energy store that has the highest voltage as compared to the remaining energy stores.

9 Claims, 1 Drawing Sheet

FOREIGN PATENT DOCUMENTS

| | | |
|---|---|---|
| DE | 43 13 124 A1 | 10/1994 |
| DE | 44 32 444 A1 | 3/1995 |
| DE | 197 17 155 A1 | 10/1997 |
| DE | 197 52 661 A1 | 6/1999 |
| DE | 197 52 622 C1 | 9/1999 |
| EP | 0 471 871 A1 | 2/1992 |

* cited by examiner

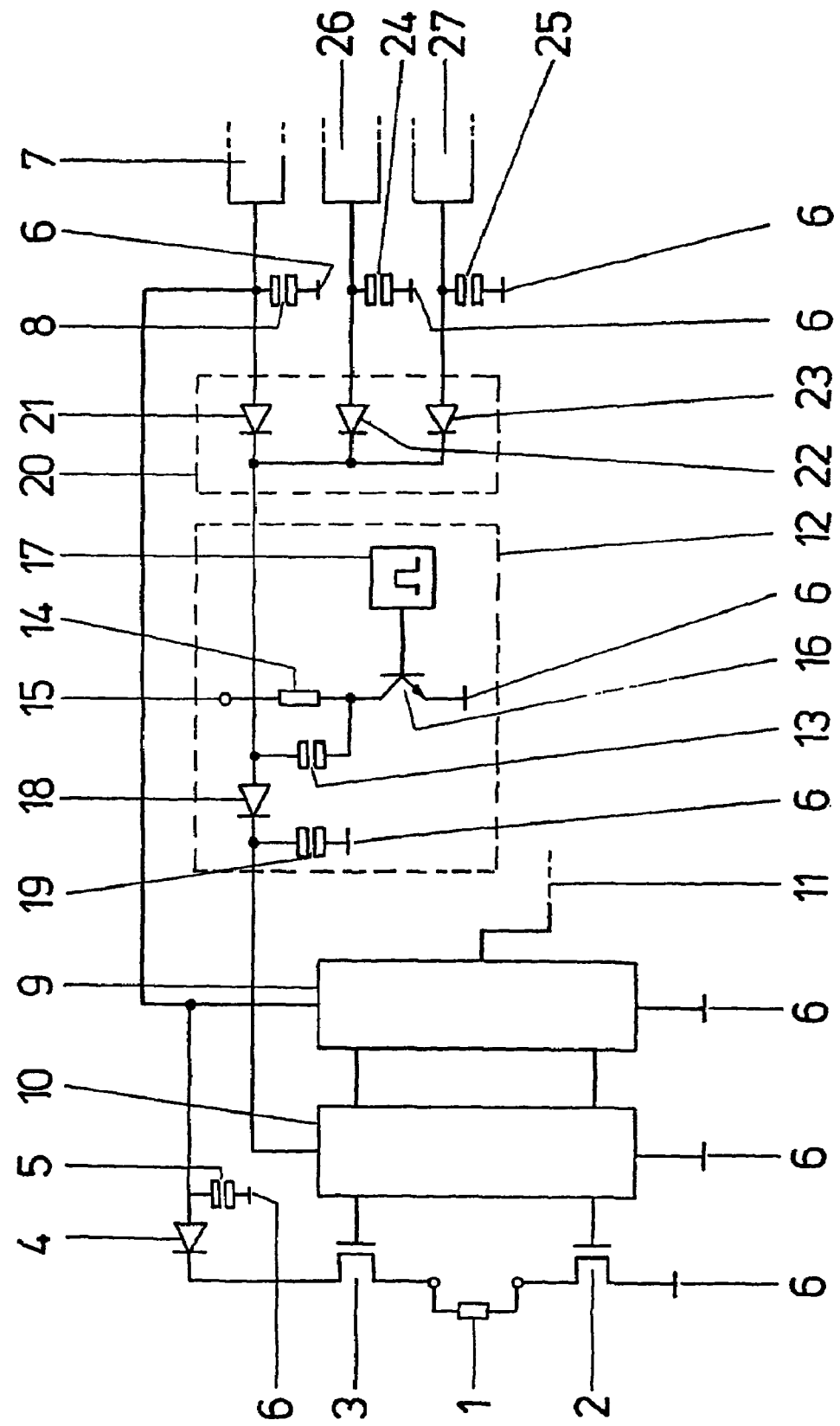

DEVICE AND METHOD FOR SUPPLYING THE TRIGGERING DEVICE OF AN OCCUPANT RESTRAINT SYSTEM WITH POWER

CLAIM FOR PRIORITY

This application claims priority to International Application No. PCT/DE01/01619 which was published in the German language on Dec. 6, 2001.

TECHNICAL FIELD OF THE INVENTION

The invention relates to a device and a method for supplying power to a firing means of a vehicle-occupant restraint system.

BACKGROUND OF THE INVENTION

What are referred to as electric firing circuits form the essential component of a controller for vehicle-occupant restraint systems, for example airbag controllers. Such firing circuits contain, as their essential component, at least one firing cap which causes the airbag propellant to explode when firing occurs by supplying electrical energy. Further components or at least two electronic switches which are frequently implemented as part of a customized circuit, for example in the form of a MOS field-effect transistor. The switches which are usually opened are closed when the respective airbag is fired, by means of a control signal which is correspondingly adapted by a driver circuit for controlling the switches (MOS field-effect transistor). The electronic switches have, in the connected-through state, an electrical contact resistance which is, inter alia, a function of the gate voltage of the respectively used MOS field-effect transistor. In order to achieve low power losses it is favorable to keep the contact resistance during the firing to a minimum. However, for this purpose the gate voltage of the MOS field-effect transistor must be as high as possible. This factor in itself requires the supply voltage of the driver circuit for the electrical circuits to be kept high for as long as possible, the supply voltage then being several volts above the firing voltage.

For this reason, a switching regulator which increases the battery voltage of the vehicle to the level of the firing voltage is usually provided in the airbag controller. A step-up converter, which has a capacitor (preferably electrolytic capacitor) for smoothing the switching voltage and for buffering the energy necessary to operate a control device (ECU), is usually used to step up the voltage. The energy reserve stored in the capacitor (acting as an energy store) is fed via a diode to a charge pump whose output voltage is several volts higher than the firing voltage. The voltage which is stepped up by the charge pump is then used to supply the driver circuit for the switches.

However, energy is removed from the energy store (capacitor) during the firing process and, as a result, the voltage across the energy store drops. This can lead to a situation in which sufficient voltage to ensure complete through-connection of the MOS field-effect transistors is no longer available. As a result of this, under certain circumstances the firing process can in turn only be carried out incompletely, which itself can lead to faults in the overall functioning of the airbag.

SUMMARY OF THE INVENTION

The invention improves the through-connection of the power supply of a vehicle-occupant restraint system.

In one embodiment of the invention, alongside the energy store at least one further energy store is additionally made available in the step-up converter in a controller for a vehicle-occupant restraint system. During the firing of the firing means (firing caps), the various energy stores are loaded to differing degrees so that the voltages at the individual energy stores drop at different speeds. According to one embodiment of the invention, the driver circuit is supplied via a selector circuit from at least two such energy stores such that the driver circuit is always supplied from the energy store with the voltage which is the highest in relation to the remaining energy stores. This measure ensures that the highest voltage is always used to supply the driver circuit so that the driver circuit is supplied in an optimum way using the means available. A further advantage is that if an energy store is already loaded by the firing process, and its voltage thus sinks, this store is not yet additionally loaded with supplying the driver circuit.

In another embodiment, it is possible, for example, for a switching device which connects the energy store with the respective highest voltage to the driver circuit to be provided as the selector circuit. However, a diode matrix is preferably used as it requires a small outlay in terms of circuitry and provides a high level of operational reliability.

For example, the energy stores in the firing circuits of front airbags of the vehicle-occupant restraint system and/or in the firing circuits of side airbags of the vehicle-occupant restraint system and/or in a step-up converter for generating a firing voltage for the vehicle-occupant restraint system and/or in a step-up converter for generating a supply voltage for the control device are used as suitable energy stores, a single step-up converter being preferably used both to generate the firing voltage and to generate the supply voltage. As a result, energy stores which are already present in the system are used so that the efficiency of the overall system is increased, and in the process the outlay in terms of circuitry can be kept low.

In order to be able to generate a sufficient high drive voltage when MOS field-effect transistors are used as switches, in particular as high-side switches, in one embodiment of the invention the driver circuit is supplied from the energy stores via a charge pump. For this purpose, a charge pump is connected between the selector circuit and the supply lines of the driver circuit.

In one aspect, the charge pump can have a further energy store for buffering energy and thus increasing the reliability of supply.

In another aspect, capacitors, and in particular electrolytic capacitors or gold capacitors owing to their high capacitances, are used as energy stores. In this context, capacitors have a relatively favorable price/capacitance ratio in comparison to other energy stores. However, specific types of accumulator batteries, for example polymer film accumulator batteries, can also be applied.

BRIEF DESCRIPTION OF THE DRAWINGS

The invention will be explained in more detail below with reference to the exemplary embodiments illustrated in the FIGURE.

FIG. 1 illustrates a firing device in accordance with the invention.

DETAILED DESCRIPTION OF THE PREFERRED EMBODIMENTS

In the firing device which is shown as an exemplary embodiment, an airbag (not illustrated) is fired when necessary by means of a firing cap 1. The firing cap is connected to a firing voltage by means of two MOS field-effect transistors 2 and 3 which are used as controlled switches, it being possible to tap the firing voltage to a firing capacitor 5 by means of a diode 4. For this purpose, the firing cap 1 is connected via the drain-source path of the MOS field-effect transistor 2 to a terminal of the firing capacitor 5 which is connected to a reference potential 6, and on the other hand to the other terminal of the firing capacitor 5 with intermediate connection of the drain-source path of the MOS field-effect transistor 3 and of the diode 4. The firing capacitor 5 is fed by a step-up converter 7 which includes a storage capacitor 8. The firing voltage 8 which is provided both for firing the firing cap (in conjunction with firing capacitor 5) and for operating a control device 9 in the present exemplary embodiment, can be tapped at the storage capacitor 8. The control device 9 controls a driver circuit 10 as a function of a signal 11 of a crash sensor (not illustrated in the drawing). The driver circuit 10 is finally coupled to the gate terminals of the MOS field-effect transistors 2 and 3 in order to connect them through when necessary in accordance with the driving by the control device 9.

In the exemplary embodiment, the two MOS field-effect transistors 2 and 3 are preferably of identical design so that the MOS field-effect transistor 3 correspondingly forms a high-side switch. In order to connect this transistor through sufficiently, a voltage is necessary which is greater than the firing voltage present at the firing capacitor 5 and the control device 9. For this reason, the driver circuit 10 is supplied by a charge pump 12. The charge pump 12 increases a voltage present at its input by a specific amount. In the exemplary embodiment the input voltage is approximately doubled in this context.

In particular, the present charge pump 12 comprises a capacitor 13 which is connected on the one hand to the input of the charge pump 12 and on the other hand to a node point. The node point is coupled here on the one hand to an auxiliary voltage 15 via a resistor 14 and to the reference potential 6 via the collector-emitter path of a bipolar transistor 16. The bipolar transistor 16 is driven by means of a square-wave generator 17 so that the bipolar transistor 16 is continuously switched on and off. The input of the charge pump 12 is coupled to its output via a diode 18 in the conducting direction, the output being connected to the reference potential 6 via a storage capacitor 19. The voltage at the input of the charge pump 12 is made available by a selector switch 20. The selector switch 20 includes a diode matrix with three individual diodes 21, 22 and 23 which are connected in the conducting direction and are at the same time connected respectively to an energy store at the input end and to one another at the output end.

In addition to the storage capacitor 8 of the step-up converter 7, the storage capacitors 24 and 25 of a front airbag controller 26 and of a side airbag controller 27 are also provided as energy stores.

As a result, the airbag controller (ECU) in the present exemplary embodiment has a total of at least three energy reserves, namely the reserve of the step-up converter 7, the energy reserve of the front firing circuit (front airbag controller 26) and the energy reserve for the side firing circuit (side airbag controller 27) and if appropriate the reserve of the charge pump. If the voltage of the step-up converter 7 collapses during an impact owing to the connections of the car battery being torn off while at the same time the front airbags are fired, the driver circuits of the firing circuits can be fed from the side energy reserve which is not loaded and which can keep its voltage virtually at the initial firing voltage.

The invention claimed is:

1. A device for supplying power to a firing unit of a vehicle-occupant restraint system, comprising:
   a plurality of switches formed as MOS transistors having gate terminals;
   a plurality of energy storage devices;
   a control device;
   a driver circuit for the vehicle-occupant restraint system, the driver circuit coupled to the gate terminals of the MOS transistors;
   a selector circuit supplying the driver circuit with a voltage from one of the energy storage devices that is higher than a voltage of any other one of the energy storage devices; and
   a charge pump connected between the selector circuit and the driver circuit.

2. The device according to claim 1, wherein the selector circuit includes a diode matrix.

3. The device according to claim 1, wherein: one of the energy storage devices is a part of a firing circuit of a front airbag of the vehicle-occupant restraint system.

4. The device according to claim 1, wherein: one of the energy storage devices is a part of a firing circuit of a side airbag of the vehicle-occupant restraint system.

5. The device according to claim 1, further comprising:
   a step-up converter for generating a firing voltage for the vehicle-occupant restraint system;
   the step-up converter including one of the energy storage devices.

6. The device according to claim 1, further comprising:
   a step-up converter for generating a supply voltage for the control device;
   the step-up converter including one of the energy storage devices.

7. The device according to claim 1, wherein the charge pump includes an energy storage device.

8. The device according to claim 1, wherein the energy storage devices are capacitors.

9. A method for supplying power to a firing unit of a vehicle-occupant restraint system, comprising:
   using switches to feed energy to the firing unit from a first storage device, the switches being MOS transistors having gate terminals;
   providing a driver circuit for actuating the MOS transistors and coupling the driver circuit to the gate terminals of the MOS transistors;
   using a selector circuit to supply the driver circuit with a voltage from one of the energy storage devices that is higher than a voltage of any other one of the energy storage devices.

* * * * *